US008043652B2

(12) United States Patent
Eby et al.

(10) Patent No.: US 8,043,652 B2
(45) Date of Patent: Oct. 25, 2011

(54) METHOD AND APPARATUS FOR ALIGNING PATTERNS ON A SUBSTRATE

(75) Inventors: Raymond K. Eby, Grayslake, IL (US); Michael Nelson, Libertyville, IL (US); Igor Touzov, Cary, NC (US)

(73) Assignee: Nanoink, Inc., Skokie, IL (US)

( * ) Notice: Subject to any disclaimer, the term of this patent is extended or adjusted under 35 U.S.C. 154(b) by 269 days.

(21) Appl. No.: 11/852,978

(22) Filed: Sep. 10, 2007

(65) Prior Publication Data
US 2008/0147346 A1     Jun. 19, 2008

Related U.S. Application Data

(62) Division of application No. 10/366,717, filed on Feb. 14, 2003, now Pat. No. 7,279,046.

(60) Provisional application No. 60/367,514, filed on Mar. 27, 2002.

(51) Int. Cl.
C23C 16/52 (2006.01)
B05D 5/00 (2006.01)
(52) U.S. Cl. .................. 427/8; 427/256; 250/492.22
(58) Field of Classification Search .............. 427/8, 256; 250/492.22
See application file for complete search history.

(56) References Cited

U.S. PATENT DOCUMENTS

| | | |
|---|---|---|
| 4,354,111 A | 10/1982 | Williams et al. |
| 4,385,238 A | 5/1983 | Westerberg et al. |
| 4,419,182 A | 12/1983 | Westerberg et al. |
| 4,465,934 A | 8/1984 | Westerberg et al. |
| 4,636,634 A | 1/1987 | Harper et al. |
| 4,644,143 A | 2/1987 | McJohnson et al. |
| 4,778,561 A | 10/1988 | Ghanbari |
| 5,025,658 A | 6/1991 | Elings et al. |
| 5,077,473 A | 12/1991 | Elings et al. |
| 5,109,430 A | 4/1992 | Nishihara et al. |
| 5,117,110 A | 5/1992 | Yasutake |

(Continued)

FOREIGN PATENT DOCUMENTS
WO    WO 93/18525 A1    9/1993
(Continued)

OTHER PUBLICATIONS

Hong, S., et al., "Multiple Ink Nanolithography: Toward a Multiple-Pen Nano-Plotter", *Science*, vol. 286, p. 523 (1999).

(Continued)

*Primary Examiner* — Shamim Ahmed
(74) *Attorney, Agent, or Firm* — Foley & Lardner LLP

(57) ABSTRACT

A system and method for aligning prior patterning positions formed by a first SPM tip with a second SPM tip in combination with an SPM system includes identifying first location information that includes a location of the first SPM tip and a sample reference location on an SPM sample and storing the first location information in a storage area. After replacing the first SPM tip with the second SPM tip, second location information, which includes a location of the second SPM tip and the sample reference location on the SPM sample, is identified. Displacement is calculated between the location of the second SPM tip and the first SPM tip based on the first and second location information, and either the second SPM tip or a stage supporting the SPM sample is translated to align the second SPM tip with the location of the first SPM tip in accordance with the calculated displacement.

18 Claims, 6 Drawing Sheets

U.S. PATENT DOCUMENTS

| | | | |
|---|---|---|---|
| 5,155,550 A | 10/1992 | Barger |
| 5,188,705 A | 2/1993 | Swanson et al. |
| 5,224,376 A | 7/1993 | Elings et al. |
| 5,241,182 A | 8/1993 | Martin et al. |
| 5,298,975 A | 3/1994 | Khoury et al. |
| 5,376,791 A | 12/1994 | Swanson et al. |
| 5,414,514 A | 5/1995 | Smith et al. |
| 5,435,850 A | 7/1995 | Rasmussen |
| 5,461,600 A | 10/1995 | Pohl |
| 5,541,411 A | 7/1996 | Lindquist et al. |
| 5,598,387 A | 1/1997 | Pohl |
| 5,644,512 A | 7/1997 | Chernoff et al. |
| 5,648,854 A | 7/1997 | McCoy et al. |
| 5,705,814 A | 1/1998 | Young et al. |
| 5,772,905 A | 6/1998 | Chou |
| 5,825,670 A | 10/1998 | Chernoff et al. |
| 5,827,786 A | 10/1998 | Puretz |
| 5,831,181 A | 11/1998 | Majumdar et al. |
| 5,854,487 A | 12/1998 | Braunstein et al. |
| 5,858,802 A | 1/1999 | Chai-Gao et al. |
| 5,879,860 A | 3/1999 | Rosolen et al. |
| 5,907,400 A | 5/1999 | Aziz |
| 5,929,987 A | 7/1999 | Hayes |
| 6,057,546 A | 5/2000 | Braunstein et al. |
| 6,100,524 A | 8/2000 | Yagi et al. |
| 6,133,986 A | 10/2000 | Johnson |
| 6,139,831 A | 10/2000 | Shivashankar |
| 6,141,072 A | 10/2000 | Drabik et al. |
| 6,181,097 B1 | 1/2001 | Li et al. |
| 6,188,485 B1 | 2/2001 | Stumpe |
| 6,211,527 B1 | 4/2001 | Chandler |
| 6,224,718 B1 | 5/2001 | Meyer |
| 6,238,582 B1 | 5/2001 | Williams et al. |
| 6,266,183 B1 | 7/2001 | Guenther et al. |
| 6,268,608 B1 | 7/2001 | Chandler |
| 6,270,946 B1 | 8/2001 | Miller |
| 6,280,939 B1 | 8/2001 | Allen |
| 6,287,880 B1 | 9/2001 | Erickson et al. |
| 6,299,740 B1 | 10/2001 | Hieronymi et al. |
| 6,309,580 B1 | 10/2001 | Chou |
| 6,310,342 B1 | 10/2001 | Braunstein et al. |
| 6,313,905 B1 | 11/2001 | Brugger et al. |
| 6,322,672 B1 | 11/2001 | Shuman et al. |
| 6,323,483 B1 | 11/2001 | Cleveland et al. |
| 6,345,086 B1 | 2/2002 | Ferrandino et al. |
| 6,353,219 B1 | 3/2002 | Kley |
| 6,353,221 B1 | 3/2002 | Elings |
| 6,355,420 B1 | 3/2002 | Chan |
| 6,373,070 B1 | 4/2002 | Rasmussen |
| 6,395,146 B2 | 5/2002 | Hieronymi et al. |
| 6,414,307 B1 | 7/2002 | Gerlach et al. |
| 6,427,345 B1 | 8/2002 | Alvis |
| 6,441,371 B1 * | 8/2002 | Ahn et al. ............... 850/1 |
| 6,449,048 B1 | 9/2002 | Olszak |
| 6,457,350 B1 | 10/2002 | Mitchell |
| 6,459,489 B1 | 10/2002 | Farrell et al. |
| 6,463,184 B1 | 10/2002 | Gould et al. |
| 6,469,761 B1 | 10/2002 | Drabik et al. |
| 6,486,480 B1 | 11/2002 | Leung et al. |
| 6,493,093 B2 | 12/2002 | Haraski et al. |
| 6,498,685 B1 | 12/2002 | Johnson |
| 6,545,492 B1 | 4/2003 | Altmann et al. |
| 6,545,761 B1 | 4/2003 | Aziz et al. |
| 6,547,559 B1 | 4/2003 | Hodos |
| 6,552,806 B1 | 4/2003 | Swinford et al. |
| 6,556,305 B1 | 4/2003 | Aziz et al. |
| 6,573,369 B2 | 6/2003 | Henderson et al. |
| 6,590,208 B2 | 7/2003 | Massie |
| 6,590,324 B1 | 7/2003 | Kanarov et al. |
| 6,624,893 B1 | 9/2003 | Schmit et al. |
| 6,624,894 B2 | 9/2003 | Olszak et al. |
| 6,635,311 B1 | 10/2003 | Mirkin et al. |
| 6,641,705 B2 | 11/2003 | Phaneuf et al. |
| 6,642,129 B2 | 11/2003 | Liu et al. |
| 6,642,517 B1 | 11/2003 | Ghislain et al. |
| 6,649,919 B2 | 11/2003 | Chao et al. |
| 6,661,009 B1 | 12/2003 | Groholski et al. |
| 6,674,074 B2 | 1/2004 | Schwartz |
| 6,680,562 B1 | 1/2004 | McGinn et al. |
| 6,683,320 B2 | 1/2004 | Gerlach et al. |
| 6,693,278 B2 | 2/2004 | Maas et al. |
| 6,693,282 B1 | 2/2004 | Tiemeijer |
| 6,709,554 B2 | 3/2004 | Ferranti et al. |
| 6,710,338 B2 | 3/2004 | Gerlach et al. |
| 6,716,332 B1 | 4/2004 | Yoshioka et al. |
| 6,737,646 B2 | 5/2004 | Schwartz |
| 6,738,511 B1 | 5/2004 | Farrell et al. |
| 6,738,538 B2 | 5/2004 | Antaki et al. |
| 6,759,807 B2 | 7/2004 | Wåhlin |
| 2002/0063212 A1 | 5/2002 | Mirkin et al. |
| 2002/0122873 A1 | 9/2002 | Mirkin et al. |
| 2004/0026007 A1 * | 2/2004 | Hubert et al. ............... 156/64 |
| 2004/0120577 A1 | 6/2004 | Touzov |
| 2005/0174130 A1 * | 8/2005 | Bonnell et al. ............... 324/719 |

FOREIGN PATENT DOCUMENTS

| WO | WO 97/08733 A1 | 3/1997 |
|---|---|---|
| WO | WO 00/41213 | 7/2000 |

OTHER PUBLICATIONS

Hong, S., et al., "A Nanoplotter with Both Parallel and Serial Writing Capabilities", *Science*, vol. 288, p. 1808 (2000).

Hubert, B., "Pick-and-Place Nanoassembly", Thesis MIT (2001).

Ohmcraft, "Welcome to MicroPen", Web Page (Dec. 17, 2002).

International Search Report dated May 21, 2004.

* cited by examiner

REDISPLAYED
IMAGE OF FIRST TIP

LIVE IMAGE OF
SECOND TIP

METHOD AND APPARATUS FOR ALIGNING PATTERNS ON A SUBSTRATE

PRIOR RELATED APPLICATIONS

This is a divisional application of U.S. Ser. No. 10/366,717 filed Feb. 14, 2003, now U.S. Pat. No. 7,279,046, which claims priority to U.S. Provisional Application No. 60/367,514 filed Mar. 27, 2002, and all prior related applications cited herein are incorporated by reference in their entireties.

FIELD OF INVENTION

The present invention generally relates to scanning probe microscopes, and more specifically, to methods for aligning at least two consecutive nanolithographic patterns on a substrate or surface of interest using scanning probe microscopes having a single probe tip, or a plurality (e.g., an array) of two or more tips.

BACKGROUND OF THE INVENTION

Scanning probe microscopes (SPMs) can be used to obtain extremely detailed analyses of the topographical or other features of a surface, with sensitivities extending down to the scale of individual atoms and molecules. SPMs basically scan a probe over a sample surface and make local measurements of the properties of the sample surface. Several components are common to practically all scanning probe microscopes. The essential component of the microscope is a tiny probe positioned in very close proximity to a sample surface and providing a measurement of its topography or some other physical parameter, with a resolution that is determined primarily by the shape of the tip and its proximity to the surface. In a scanning force microscope (SFM), the probe includes a tip which projects from the end of a cantilever. Typically, the tip is very sharp to achieve maximum lateral resolution by confining the force interaction to the end of the tip.

One common example of an SPM is the atomic force microscope (AFM), also known as the scanning force microscope (SFM). By measuring motion, position or angle of the free end of the cantilever, many properties of a surface may be determined including surface topography, local adhesion, friction, elasticity, the presence of magnetic or electric fields, etc. In operation, an AFM typically will scan the tip of the probe over the sample while keeping the force of the tip on the surface constant, such as by moving either the base of the lever or the sample upward or downward to maintain deflection of the lever portion of the probe constant. Therefore, the topography of a sample may be obtained from data on such vertical motion to construct three dimensional images of the surface topography.

It is also known that AFMs utilize analog and digital feedback circuits to vary the height of the tip of the probe or the sample based upon the deflection of the lever portion of the probe as an input. An image may be formed by scanning a sample with respect to the probe in a raster pattern, recording data at successive points in the scan, and displaying the data on a video display. The development of atomic/scanning force microscopy is described in articles by G. Binnig at al., Europhys. Lett., Vol. 3, p. 1281 (1987), and 1. R. Albrecht et al., J. Vac. Sci. Technology, A6, p. 271 (1988). The development of the cantilever for AFMs is described in an article by T. R. Albrecht at al., entitled "Microfabricated Cantilever Stylus for Atomic Force Microscopy". J. Vac. Sci. Technol., A8, p. 3386 (1990).

Other types of SPMs, such as scanning capacitance or scanning magnetic force microscopes, also use similar deflection sensors. Moreover, scanning tunneling microscope (STM) is similar to an SFM in overall structure and purpose, except that the probe consists of a sharpened conductive needle-like tip rather than a cantilever. The surface to be mapped must generally be conductive or semiconductive. The metallic needle is typically positioned a few Angstroms above the surface. When a bias voltage is applied between the tip and the sample, a tunneling current flows between the tip and the surface. The tunneling current is exponentially sensitive to the spacing between the tip and the surface and thus provides a representation of the spacing. The variations in the tunneling current in an STM are therefore analogous to the deflection of the cantilever in an SFM. The head contains circuitry for biasing the tip with respect to the sample and preamplifying the tunneling current before it is passed to a controller. Further details of SPMs are described in U.S. Pat. Nos. 5,025,658 and 5,224,376, the entire disclosures of which are incorporated herein by reference.

DIP PEN NANOLITHOGRAPHY™ (a trademark of Nanoink, Inc.) printing, also referred to as DPN (also a trademark of Nanoink, Inc.) printing, is conceptually the nano-version of the 4,000-year-old quill pen. DPN printing, which can be performed using an SPM, is a direct-write lithography technique based upon the transport of materials from a nanoscopic tip onto a surface of interest (e.g., paper). DPN printing allows one to draw fine lines or patterns one molecule high and a few dozen molecules wide.

In one embodiment of DPN printing, an AFM tip is coated with a patterning compound (also referred to herein as an "ink"), and the coated tip is contacted with the substrate so that the patterning compound is applied by capillary transport to the substrate to produce a desired pattern in submicrometer dimensions. Chemisorption can be used as the driving force for patterning ink onto the paper, as the tip is scanned across this paper. Through DPN printing, line widths can be controlled by adjusting scan rate and relative humidity. The relative humidity controls the size of the meniscus between the AFM tip and surface of interest and, therefore, the effective contact area between pen and paper.

By way of example of DPN printing methodology, an oily "ink" of octadecanethiol (ODT) is applied uniformly to an AFM's tip. When the tip is brought into contact with a thin sheet of a gold substrate or "paper," the ODT molecules are transferred to the gold's surface via a tiny water droplet that forms naturally at the tip. Other details of DPN printing methodology are described in International Patent Application No. PCT/US00/0031 9, the entire disclosure of which (including defined terms contained therein) is incorporated herein by reference.

When using multiple inks or patterning compounds with DPN printing, probe tips of different patterning compounds sometimes need to be interchanged or even replaced during the process, as needed. Also, the sample sometimes needs to be removed for an intermediate processing step. As a result, finding a previously deposited patterning compound on a sample surface requires cumbersome and imprecise manual techniques. One such technique involves the use of plastic sheets that are taped onto a CRT screen showing an image of the sample surface. Markers are then used to manually mark up the plastic sheet to essentially designate positional coordinates of the relevant objects depicted on the CRT screen. In order to work with a sample that was previously made, or when changing patterning compounds, a DPN printing experimenter must utilize the plastic sheet template that was created in a correct orientation. As can be appreciated, the manual nature of marking coordinates to align multi-ink patterns is tedious and inconvenient, increases the chance for misalignment errors, and increases the time and effort needed to perform multi-ink DPN printing. Thus, there remains a need for more efficient methods and apparatuses that allow multi-ink patterning to be performed with more than three or four inks without the attendant disadvantages of conventional methods and apparatuses.

SUMMARY OF THE INVENTION

In one aspect of the present invention, a system and method for aligning prior patterning positions formed by a first SPM tip with a second SPM tip in combination with an SPM system includes identifying first location information that includes a location of the first SPM tip and a sample reference location on an SPM sample and storing the first location information in a storage area. After replacing the first SPM tip with the second SPM tip, second location information, which includes a location of the second SPM tip and the sample reference location on the SPM sample, is identified. Displacement is calculated between the location of the second SPM tip and the first SPM tip based on the first and second location information, and either the second SPM tip or a stage supporting the SPM sample is translated to align the second SPM tip with the location of the first SPM tip in accordance with the calculated displacement.

BRIEF DESCRIPTION OF THE DRAWINGS

The accompanying drawings, which are incorporated in, and constitute a part of the specification, illustrate embodiments of the present invention and, together with the description, serve to explain the principles of the present invention.

DETAILED DESCRIPTION OF THE PREFERRED EMBODIMENTS

Figure 1:
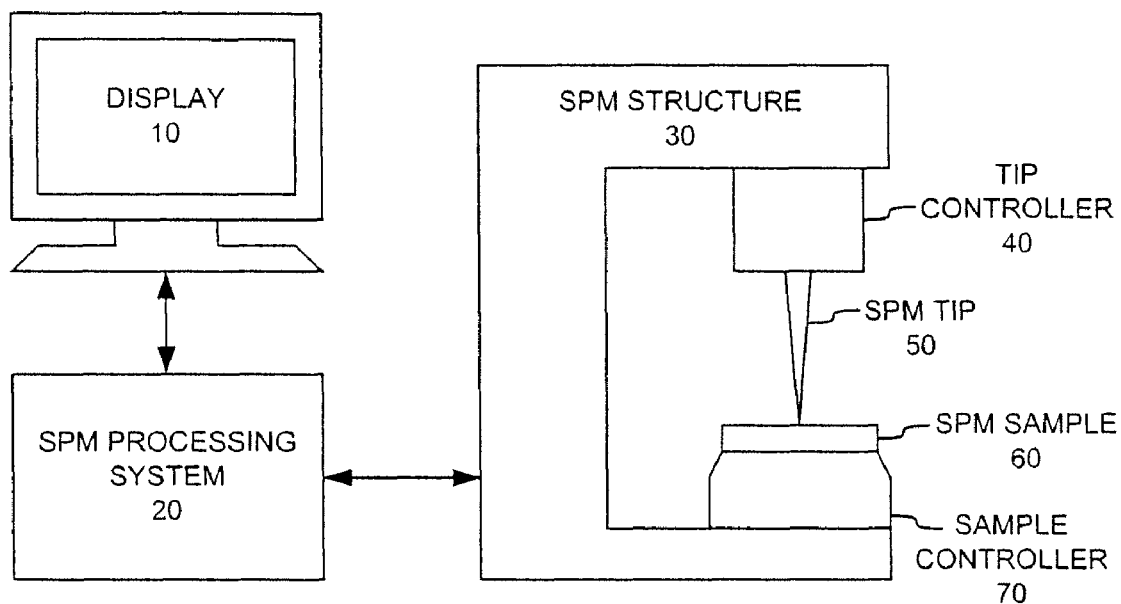
FIG. 1 is a block diagram of an SPM system consistent with the present invention.

The following applications provide additional support and description of DPN printing.

1. U.S. Provisional application 60/115,133 filed Jan. 7, 1999 ("Dip Pen Nanolithography").
2. U.S. Provisional application 60/157,633 filed Oct. 4, 1999 ("Methods Utilizing Scanning Probe Microscope Tips and Products Therefor or Produced Thereby").
3. U.S. Regular patent application Ser. No. 09/477,997 filed Jan. 5, 2000 ("Methods Utilizing Scanning Probe Microscope Tips and Products Therefor or Produced Thereby").
4. U.S. Provisional application 60/207,713 filed May 26, 2000 ("Methods Utilizing Scanning Probe Microscope Tips and Products Therefor or Produced Thereby").
5. U.S. Provisional application 60/207,711 filed May 26, 2000 ("Methods Utilizing Scanning Probe Microscope Tips and Products Therefor or Produced Thereby").
6. U.S. Regular application Ser. No. 09/866,533 filed May 24, 2001 ("Methods Utilizing Scanning Probe Microscope Tips and Products Therefor or Produced Thereby").
7. U.S. patent publication number 2002/0063212 A1 published May 30, 2002 ("Methods Utilizing Scanning Probe Microscope Tips and Products Therefor or Produced Thereby").
8. U.S. patent publication number 2002/0122873 A1 published Sep. 5, 2002 ("Nanolithography Methods and Products Produced Therefor and Produced Thereby").
9. PCT publication number WO 00/41213 A1 published Jul. 13, 2000 based on PCT application no. PCT/US00/00319 filed Jan. 7, 2000 ("Methods Utilizing Scanning Probe Microscope Tips and Products Therefor or Produced Thereby").
10. PCT publication number WO 01/91855 A1 published Dec. 6, 2001 based on PCT application no. PCT/US01/17067 filed May 25, 2001 ("Methods Utilizing Scanning Probe Microscope Tips and Products Therefor or Produced Thereby").
11. U.S. Provisional application 60/326,767 filed Oct. 2, 2001, ("Protein Arrays with Nanoscopic Features Generated by Dip-Pen Nanolithography").
12. U.S. Provisional application 60/337,598 filed Nov. 30, 2001, ("Patterning of Nucleic Acids by Dip-Pen Nanolithography").
13. U.S. Provisional application 60/341,614 filed Dec. 17, 2001, ("Patterning of Solid State Features by Dip-Pen Nanolithography").
14. U.S. Provisional application 60/367,514 filed Mar. 27, 2002, ("Method and Apparatus for Aligning Patterns on a Substrate").
15. U.S. Provisional application 60/379,755 filed May 14, 2002, ("Nanolithographic Calibration Methods").
16. U.S. Regular application Ser. No. 60/326,767 filed Oct. 2, 2002, ("Protein And Peptide Nanoarrays").

In particular, for example, in prior application Ser. No. 09/866,533, filed May 24, 2001, direct-write nanolithographic printing background and procedures are described in detail covering a wide variety of embodiments including, for example: background (pages 1-3); summary (pages 3-4); brief description of drawings (pages 4-10); use of scanning probe microscope tips (pages 10-12); substrates (pages 12-13); patterning compounds (pages 13-17); practicing methods including, for example, coating tips (pages 18-20); instrumentation including nanoplotters (pages 20-24); use of multiple layers and related printing and lithographic methods (pages 24-26); resolution (pages 26-27); arrays and combinatorial arrays (pages 27-30); software and calibration (pages 30-35; 68-70); kits and other articles including tips coated with hydrophobic compounds (pages 35-37); working examples (pages 38-67); corresponding claims and abstract (pages 71-82); and FIGS. 1-28.

All of the above text, including each of the various subsections enumerated above including the figures, is hereby incorporated by reference in its entirety and form part of the present disclosure, supporting the claims.

Finally, provisional patent application 60/382,596 filed May 21, 2002 to Mirkin et al. is hereby incorporated by reference, particularly for its disclosure concerning the deposition of proteins and peptides with use of DPN printing.

Other guidance on carrying out DPN printing procedures include US patent publication 2002 0122873 A1, published Sep. 5, 2002 to Mirkin et al., which is hereby incorporated by reference. This application includes, for example, use of tips which have external openings and internal cavities, and use of electrical, mechanical, and chemical driving forces. One method includes aperture pen nanolithography.

FIG. 1 is a block diagram of an SPM system consistent with the present invention. In one aspect, the SPM system can be implemented as an direct write nanolithographic printing or writing system. As shown in FIG. 1, the SPM system includes a display 10, an SPM processing system 20, an SPM structure 30, a tip controller 40, an SPM tip 50, an SPM sample 60 and an SPM sample controller 70. As described below, the SPM system is capable of aligning SPM tips after a change to the system, such as after a calibration process or changing of tips.

The SPM processing system 20 can be implemented in hardware, software or some combination thereof. The SPM processing system 20 may be a PC or any other computing structure that controls the operation of the SPM system and each of the elements in the SPM system. It preferably includes a CPU, a main memory, a ROM, a storage device and a communication interface all coupled together via a bus. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the SPM processing system 20 provides a two-way data communication coupling, such as to a network. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information.

If the network connection is an Internet connection, the SPM processing system 20 can transmit a requested code for an application program through the Internet, an ISP, the local network and the communication interface. The received code can be executed by the CPU in the SPM processing system 20 as it is received, stored in the storage device, or stored in some other non-volatile storage for later execution. In this manner, the SPM processing system 20 may obtain application code in the form of a carrier wave.

The SPM structure 30 serves as a support structure for the tip controller 40, the SPM tip 50, the SPM sample 60 and the SPM sample controller 70. The tip controller 40 controls the movement and operation of the SPM tip 50. The movement control includes movement in the X, Y and Z directions of the SPM tip 50. The operational control includes controlling the use of the SPM tip 50 for imaging the surface of the SPM sample 60, as well as to write patterns on the SPM sample 60, such as with the use of DPN printing.

The SPM sample controller 70 controls the positioning of the SPM sample 60. The position control includes movement in the X, Y and Z directions, as well as rotational movement. The SPM sample 60 can be a substrate or surface that is capable of being printed with nanoscale-sized patterns. The SPM sample 60 can be made of, for example, a thin sheet of gold or "paper."

The display 10 can be an LCD, CRT or other display structure. The display 10 is configured to show images generated by the SPM system. The images generated by the SPM system include microscopic images and nanoscopic images. The microscopic images can be generated, for example, by a CCD camera (not shown) mounted in the SPM structure 30. The nanoscopic images can be generated, for example, by using the SPM tip 50 to image the surface of the SPM sample 60. One example of using the SPM tip 50 to image the surface of the SPM sample 60 is to use AFM imaging.

Figure 2:
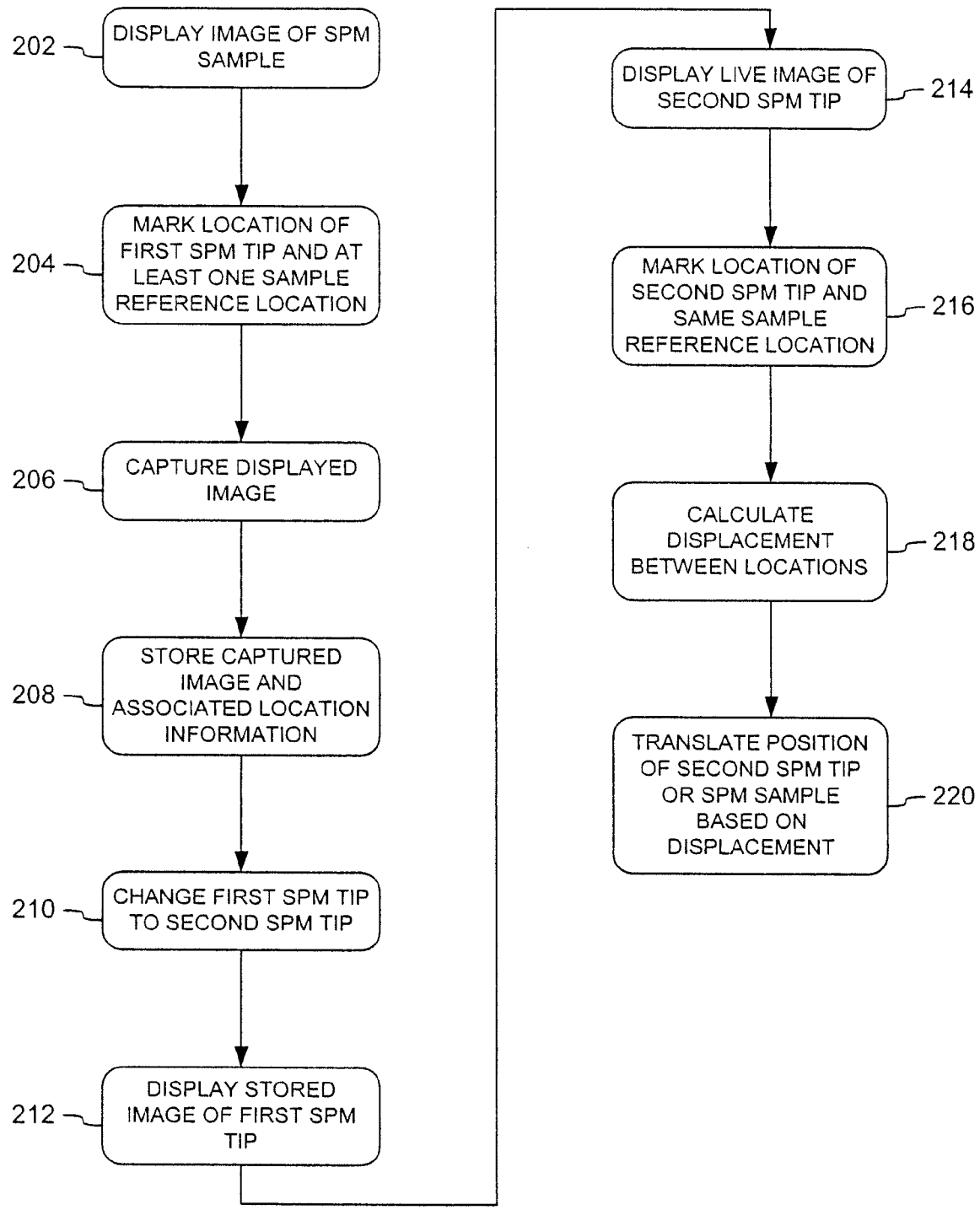
FIG. 2 is a flow diagram of an SPM tip alignment process consistent with the present invention.

FIG. 2 is a flow diagram of an SPM tip alignment process consistent with the present invention. As shown in FIG. 2, the SPM tip alignment process first displays an image of an SPM sample 60 (step 202). The image shown can be a microscopic image, which can be generated, for example, by a CCD camera placed above the SPM sample 60. The microscopic image is capable of showing features on the SPM sample that are microscopic in scale, such as the SPM tip 50.

Figure 3A:
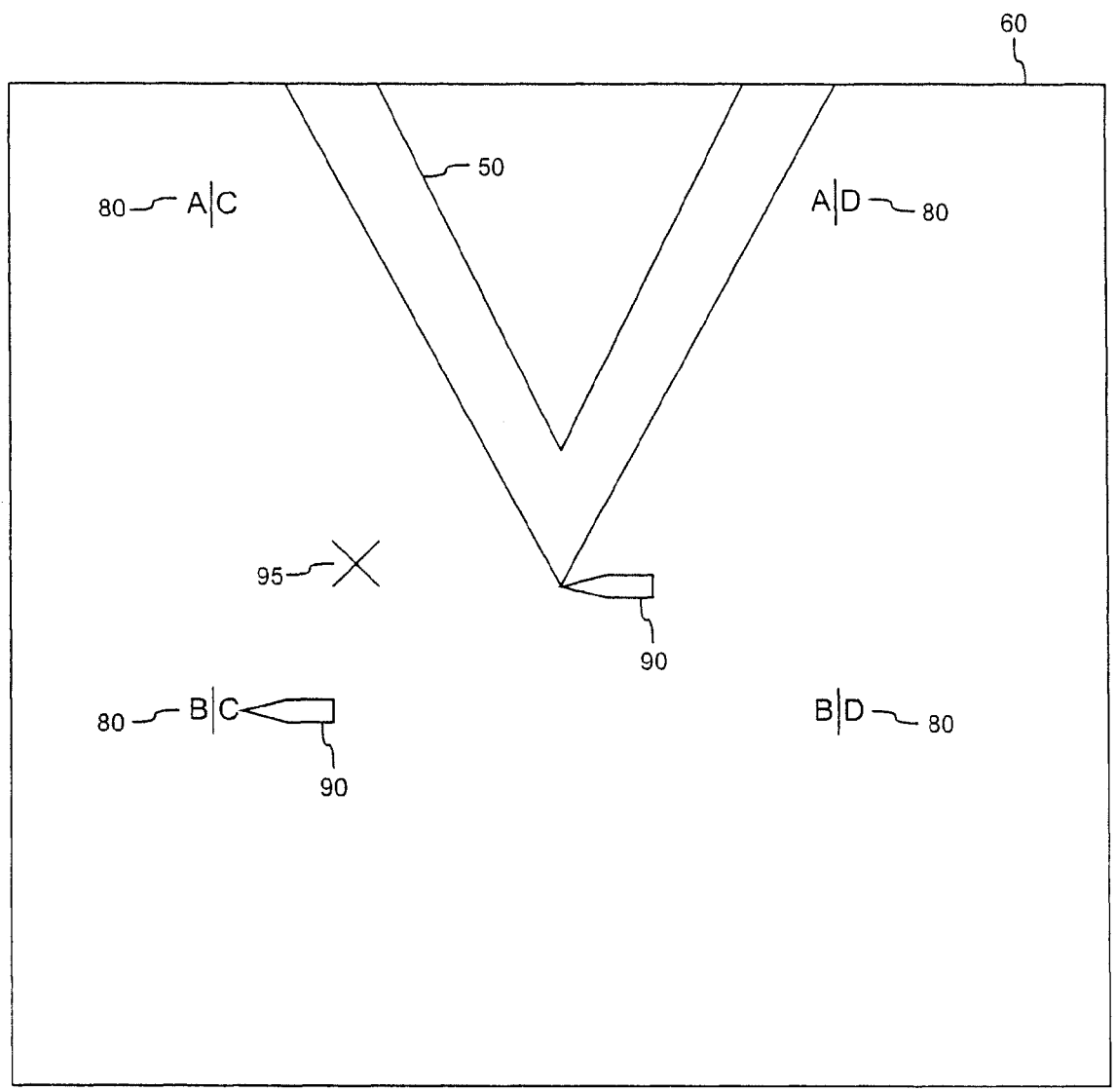
FIGS. 3A-3B depict schematic representations of a display of an SPM sample according to the SPM tip alignment process of FIG. 2.

FIG. 3A depicts a schematic representations of a display of an SPM sample according to the SPM tip alignment process of FIG. 2. The representation shown in FIG. 3A depicts a portion of the SPM sample 60 and the SPM tip 50. In addition to the SPM sample 60 and SPM tip 50, the representation shows a plurality of sample reference locations 80. As shown in FIG. 3A, the sample reference locations 80 are shown as a pair of letters separated by a solid vertical line, essentially serving to identify known locations within the SPM sample 60. The actual implementation of the sample reference locations 80 can be any marking that is visible in a microscopic image. The sample reference locations 801 can be pre-marked on the SPM sample 60 or marked manually with any mechanism suitable to create a marking visible in a microscopic image. Also shown in FIG. 3A are markers 90, which will be described in more detail below.

With reference to the displayed image, a user marks a location corresponding to the SPM tip 50 and at least one sample reference location (step 204). As shown in FIG. 3A, a first marker 90 is placed at the location of the SPM tip 50, and a second marker is placed at one of the sample reference locations 80. Although only two locations are marked with markers 90, it is possible to mark three or more locations.

To mark locations with the markers 90, a user can use a pointing device, such as a mouse, and move a cursor or icon to a desired location to be marked. In FIG. 3A, a cursor 95 is shown as an 'X,' although other cursor or icon symbols can be used. The movement to the desired location can be made with reference to the displayed image of the SPM sample 60 on the display 10. After moving the cursor 95 or icon to the desired location, the user makes an input to place a marker 90 at that location. The input can be, for example, a click of the mouse or a keyboard input. In response to the input, the marker 90 is placed at the desired location.

The location of the marker 90 corresponds to a coordinate of the image of the SPM sample 60 displayed on the display 10. The coordinate can be considered a specific X-Y coordinate. The processing system 20 can be configured to determine the coordinate in response to the input made by the user. Accordingly, each marker 90 has a corresponding X-Y coordinate.

After the user has marked the desired locations, the displayed image of the SPM sample 60 is captured (step 206). The capture of the displayed image can be performed in response to an input from the user. The input can be, for example, a click of the mouse on an icon to capture the displayed image or a keyboard input. The captured image can be an image file in a particular image format, such as a bitmap or gif file.

The captured image and the location information corresponding to the markers 90 in the captured image are then stored in a storage area (step 208). The storage area can be a non-volatile memory, such as an NVRAM or hard disk drive, that is accessible to the processing system 20. The storage area can be part of the processing system 20 or at a location separate from the processing system 20. The captured image and the location information are preferably stored in an organized manner that links the two together, as well as enabling a user to recall them. The organization can be with a table that identifies the captured image and location information as being linked and providing information about them that enables the user to recognize what is shown in the captured image.

Once the captured image and location information are stored in the storage area, the user changes the current SPM tip 50 with a different SPM tip 50 (step 210). For purposes of the following description, the tip being removed is referred to as the first SPM tip 50, and the new tip is referred to as the second SPM tip 50. Accordingly, the captured image and location information stored in the storage area correspond to the first SPM tip 50.

Changing the tip from the first SPM tip 50 to the second SPM tip 50 may cause the location of the second SPM tip to be misaligned with the prior position of the first SPM tip 50 before the tip change. The changing of the tip may occur to enable the SPM system to print a pattern with a different ink or patterning compound. This misalignment can also occur due to the SPM sample 60 being moved.

It is also possible that the same tip could be used to print patterns using different inks. In that case, there would be no exchange of tips, although the issue of misalignment still arises due to the change of ink. Even if the SPM tip 50 is not removed from the tip controller 40 to make the ink change, a misalignment can occur. For the purposes of the description below, the realignment process is discussed with respect to aligning the second SPM tip 50 with the first SPM tip 50. It should be understood, however, that the first SPM tip 50 and the second SPM tip 50 can actually be the same tip, e.g., when one tip is used to print two or more patterns with different inks.

After changing to the second SPM tip 50, the captured image of the first SPM tip 50 and SPM sample 60 is redisplayed (step 212). To redisplay the captured image, the user can refer to a list of captured images stored in the storage area and select the desired image from the list. Alternatively, the image can be redisplayed automatically in response to the changing of the tips.

Figure 3B:
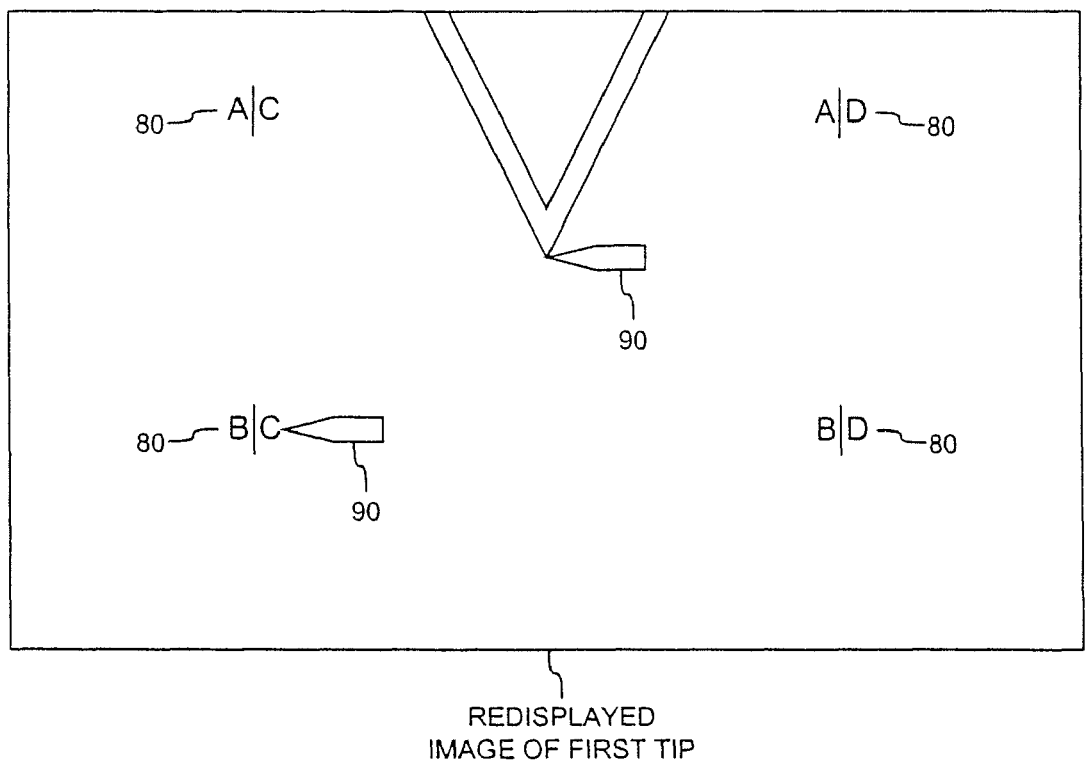
Figure 3B:
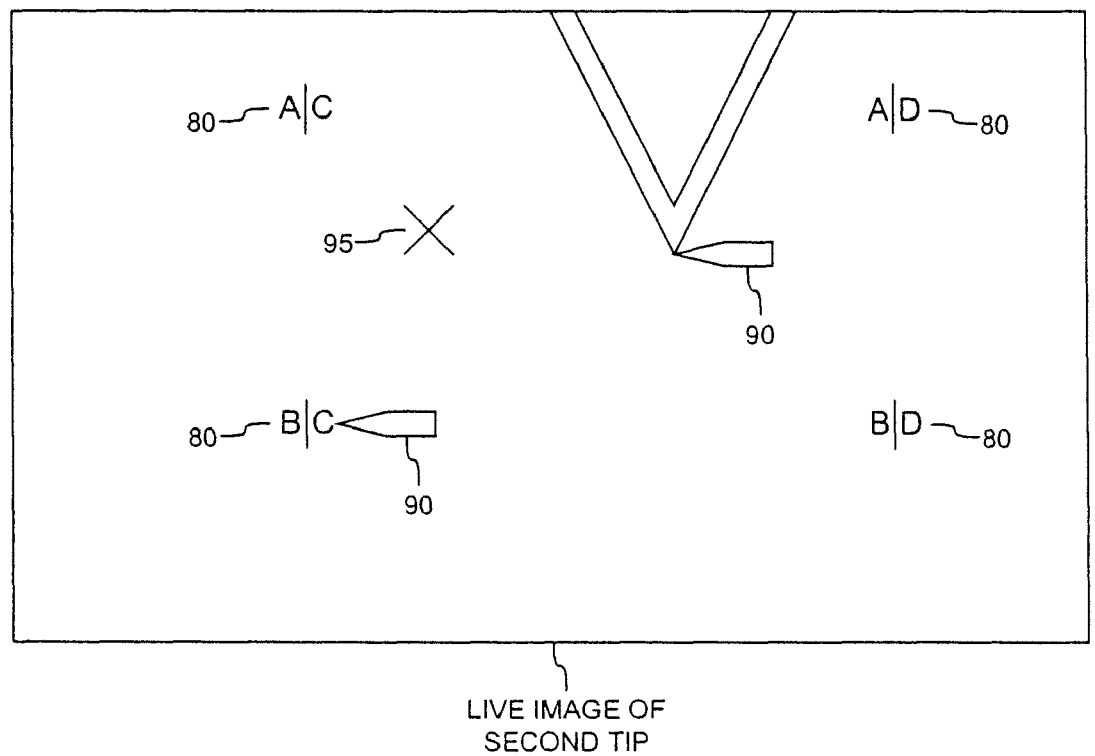

In addition to redisplaying the captured image, a live image of the SPM sample 60 and the second SPM tip 50 is displayed (step 214). The live image can be displayed on the same display as the redisplayed captured image, either in separate windows or in the same window, or the two images can be displayed on separate displays. The redisplayed captured image includes the markers 90 that were marked at the location of the first SPM tip 50 and at least one reference location 80. FIG. 3B depicts a schematic representations of a display 60 with one window showing the redisplayed image of the first tip and a second window showing the live image of the second tip.

Then, in the same manner as described above, the user marks in the live image the location of the second SPM tip 50 and the same sample reference locations 80 that are shown in the redisplayed captured image (step 216). As also described above, the location of the marker 90 corresponds to a coordinate of the live image of the SPM sample 60 displayed on the display 10 and can be considered a specific X-Y coordinate. The placement of the markers 90 provides location data for the second SPM tip 50 and the sample reference locations 80 in the live image. The location of the markers 90 can be effected by placing the cursor 95 in the desired location and making an input to place the marker 90 at the location of the cursor 95. Since at this point the location information is being created for the live image only, the cursor 95 can be displayed in the live image only.

Based on the location data corresponding to the marked locations of the redisplayed captured image and the location data corresponding to the markers 90 of the live image, an alignment displacement vector is calculated (step 218). The location data for the first SPM tip 50 and the sample reference location 80 in the redisplayed captured image can be identified from the link between that image and the associated location information stored in the storage area, as described above. The location data for the second SPM tip 50 and the sample reference location 80 in the live image is known from the markers 90 marked in the live image.

In one aspect, a first displacement vector is calculated between the sample reference location 80 in the redisplayed captured image and the same sample reference location 80 in the live image. In addition, a second displacement vector is calculated between the location of the first SPM tip 50 in the redisplayed captured image and the second SPM tip 50 in the live image. From these two vectors, the alignment displacement vector is calculated by subtracting the first displacement vector from the second displacement vector. The alignment displacement vector determines how the location of the second SPM tip 50 needs to be moved or translated to align it with the first SPM tip 50. Other methods can be used, as understood by one skilled in the art, to calculate the alignment displacement vector needed to align the second SPM tip 50 with the first SPM tip 50 based on the location data of the redisplayed captured image and the live image.

In the example described above, only one sample reference location 80 is used to calculate the alignment displacement vector. However, if the SPM sample 60 moves or rotates during the changing from the first SPM tip 50 to the second SPM tip 50, using a single sample reference location 80 may result in an inaccurate alignment displacement vector. To ensure that the alignment displacement vector is accurate and to protect against rotation of the SPM sample 60, more than one sample reference location 80 can be used. It would be understood to one skilled in the art that, in the event of the rotation of the SPM sample 60, using the displacements of more than one sample reference location 80 can lead to the calculation of an accurate alignment displacement vector.

Using the alignment displacement vector, the position of the second SPM tip 50 or the SPM sample 60 is translated or moved such that the SPM tip 50 is aligned to the position of the first SPM tip 50 on the SPM sample 60 (step 220). The SPM processing system 20 is configured to control the translation of the SPM tip 50 with the tip controller 40 based on the alignment displacement vector. The SPM processing system 20 is also configured to control the translation of the SPM sample 60 with the SPM sample controller 70 based on the alignment displacement vector. After the translation is complete, the second SPM tip 50 is aligned, on a microscopic level, with the position of the first SPM tip 50 prior to the exchange of the tips.

Figure 4:
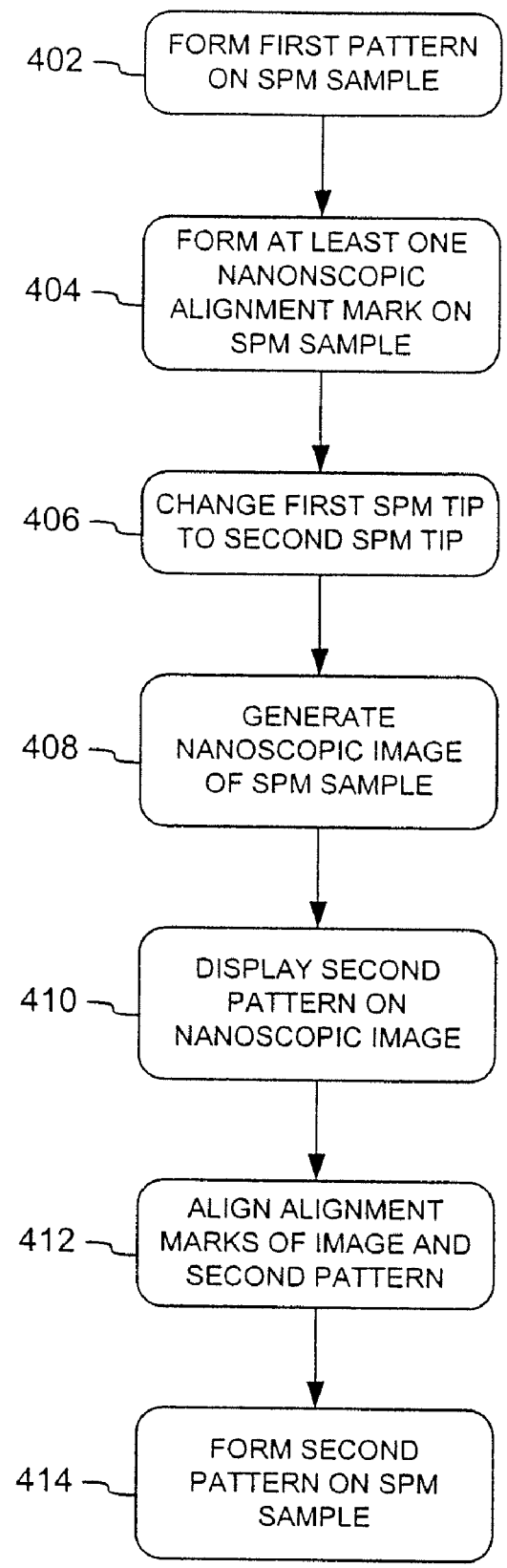
FIG. 4 is a flow diagram of a nanoscopic pattern alignment process consistent with the present invention.

FIG. 4 is a flow diagram of a nanoscopic pattern alignment process consistent with the present invention. As shown in FIG. 4, a first pattern is formed on the SPM sample 60 with the first SPM tip 50 (step 402). The pattern may be formed using DPN or other nanolithographic method using the SPM tip 50. When making the pattern, one of a variety of different inks may be used.

Figure 5A:
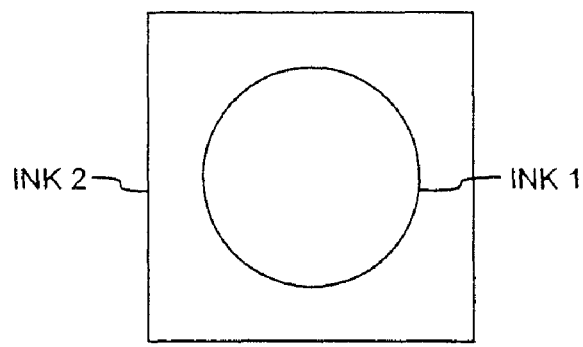
FIGS. 5A-5C depict schematic representations of a display of an SPM sample according to the nanoscopic pattern alignment process of FIG. 4.

The first pattern can be one of multiple patterns formed using different inks. For example, FIG. 5A shows an example of two different patterns, a circle formed with ink 1 and a square formed with ink 2. It should be understood that other patterns can be formed, such as dots and lines. The different patterns can be formed with the same SPM tip 50, but using different ink, or more preferably, by using different SPM tips 50 for the different inks. The SPM processing system 20 can be configured to enable a user to create different patterns and designate which patterns are to be formed with a particular ink. These patterns are then referenced by the SPM processing system 20 to direct the tip controller 40 to move the SPM tip 50 to form the patterns.

When the first pattern is made, at least one nanoscopic alignment mark is made on the SPM sample 60 (step 404). The nanoscopic alignment mark is one that is not visible at the microscopic level, but is visible at the nanoscopic level. A variety of shapes or designs such as an 'X' can be used. The nanoscopic alignment mark can be formed using the same nanolithographic method as used to form the pattern, and is preferably formed on the edge of the pattern. Each pattern to be formed by the SPM system includes the nanoscopic alignment mark. For example, as shown in FIG. 5A, the pattern corresponding to the circle of ink 1 includes a nanoscopic alignment mark, as does the pattern corresponding to the square of ink 2. The nanoscopic alignment marks of the two patterns are placed in the identical position, so that when they are aligned, so are the circle and the square.

After forming the pattern and at least one nanoscopic alignment mark, the first SPM tip 50 is exchanged for the second SPM tip (step 406). This exchange can be performed in the same manner as described above with respect to the SPM tip alignment process of FIG. 2. In fact, the forming of the first pattern and nanoscopic alignment mark can be performed simultaneously with the SPM tip alignment process of FIG. 2.

As described above with respect to FIG. 2, changing the tip from the first SPM tip 50 to the second SPM tip 50 involves physically changing between two different tips. As also described above, it is also possible that the same tip could be used to print patterns using different inks, in which case there would be no exchange of tips. Accordingly, it should be understood that the first SPM tip 50 and the second SPM tip 50 can be different tips or the same tip. In addition, if the same tip is used, it is possible that the tip is not removed from the tip controller 40.

A nanoscopic image of the SPM sample 60 is then generated (step 408). The nanoscopic image includes the first pattern and the alignment mark. The nanoscopic image can be formed using the second SPM tip 50 using a nanoscopic imaging process. The nanoscopic imaging process can be performed using, for example, AFM in which analog and digital feedback circuits vary the height of the end of the SPM tip 50 or the SPM sample 60 based upon the deflection of the lever portion of the SPM tip 50 as an input. An image is then formed by scanning the SPM sample 60 with respect to the SPM tip 50 in a raster pattern, recording data at successive points in the scan, and displaying the data on the display 10.

Figure 5B:
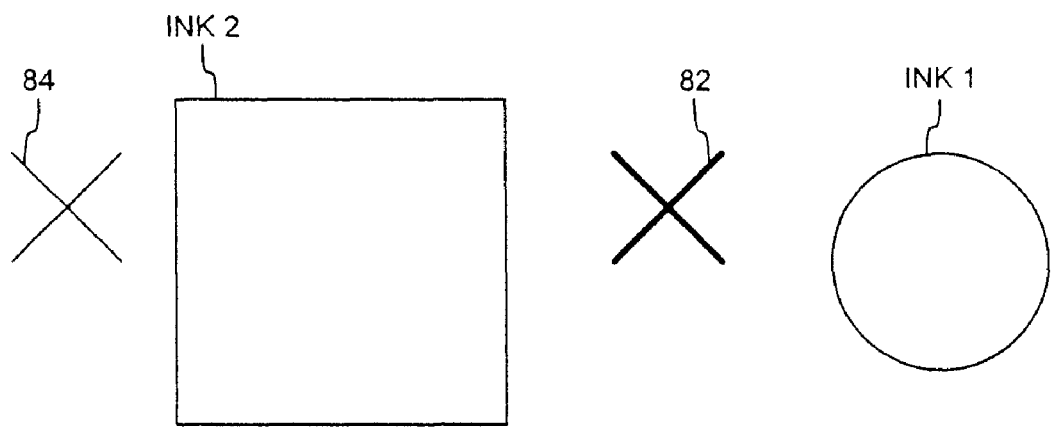

The generated image of the first pattern on the SPM sample 60 is displayed on the display 10 (step 410). In addition, the second pattern to be formed on the SPM sample 60 is overlaid on top of the generated image (step 412). For example, FIG. 5B shows the first pattern of a circle using ink 1 along with a nanoscopic alignment mark 82. In addition, the second pattern of a square using ink 2 and a corresponding virtual nanoscopic alignment mark 84, which has yet to be formed, is also shown.

Figure 5C:
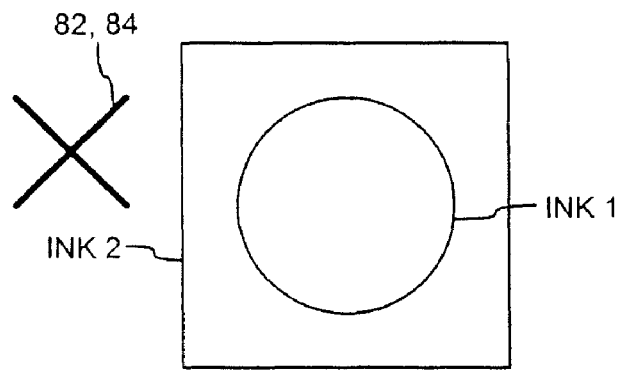

To ensure that the first and second pattern are aligned at the nanoscopic level, the nanoscopic alignment marks of the two patterns are aligned on top of each other (step 412). This alignment can be performed automatically by image recognition software or manually by a user. The manual alignment by the user can be effected using a keyboard or pointing device input via the SPM processing system 20. FIG. 5C shows that the circle of ink 1 (pattern 1) is aligned with the square of ink 2 (pattern 2) when the nanoscopic alignment mark 82 of the first pattern is aligned with the virtual nanoscopic alignment mark 84 of the second pattern. By aligning the imaged and virtual alignment marks the coordinates of the second pattern are offset to insure that it is properly aligned with the first pattern when the second pattern is formed.

Once the nanoscopic alignment marks are aligned, the second pattern is formed on the SPM sample 60 (step 414). The second pattern can be formed in the same manner as the first pattern. The process of FIG. 4 can be continued by repeating steps 406-414 to ensure that additional patterns are aligned with the first and second patterns.

The nanoscopic alignment process of FIG. 4 can be performed in conjunction with the SPM alignment process of FIG. 2. While the first SPM tip 50 is in place, the placement of markers 90 and the recording of the location information and the microscopic image can be performed, as well as the forming of the first pattern with the nanoscopic alignment mark. After changing to the second SPM tip 50, the stored microscopic image and the microscopic live image are displayed, the location of the same markers 90 in the live image are marked, and the alignment displacement vector is calculated to align the position of the second SPM tip 50 with the prior position of the first SPM tip 50. The nanoscopic imaging of the SPM sample 60 is then performed, followed by the nanoscopic alignment using the nanoscopic image, and the second pattern is formed in alignment with the first.

It should be understood that the process of alignment can include translations in the vertical and horizontal directions, as well as, rotational alignment.

Additional embodiments of this invention could include methods based on image processing and pattern recognition to automatically align subsequent SPM tips with sample reference locations. This would also enable the system to automatically align tips with multiple sample reference locations on a substrate.

Another embodiment of the present invention comprises the display of an SPM image of the sample area overlaid onto the top-down view on the video monitor to aid in the alignment process.

Other embodiments of the present invention comprise more than one top-down image overlaid on one another.

Those skilled in the art will recognize, or be able to ascertain using no more than routine experimentation, many equivalents to the specific embodiments of the invention specifically described herein. Such equivalents are intended to be encompassed in the scope of the present invention.

What is claimed is:

1. A method for aligning positions of a first SPM tip with a second SPM tip in combination with an SPM system, comprising:

identifying first location information that includes a location of the first SPM tip and a sample reference location on an SPM sample;

storing the first location information in a storage area;

identifying second location information including a location of the second SPM tip and the sample reference location on the SPM sample;

calculating a displacement between the location of the second SPM tip and the first SPM tip based on the first and second location information; and translating either the second SPM tip or a stage supporting the SPM sample to align the second SPM tip with the location of the first SPM tip in accordance with the calculated displacement, wherein the first SPM tip and the second SPM tip are different.

2. A method according to claim 1, further comprising:
capturing a first image of the first SPM tip and the sample reference location on the SPM sample;
storing the captured first image in the storage area;
displaying the first image on a display; and
displaying a second image of the second SPM tip on the SPM sample on the display.

3. A method according to claim 2, wherein the first image and second image are displayed on separate windows on the display.

4. A method according to claim 2, wherein the identifying of the sample reference location for the second location information includes determining the sample reference location from the displayed first image.

5. A method according to claim 1, wherein the identifying of the first location information comprises:
displaying a first image of the first SPM tip and the sample reference location on the SPM sample; and
receiving a first input indicating the location of the first SPM tip and a second input indicating the sample reference location, and
wherein the identifying of the second location information comprises:
displaying a second image of the second SPM tip and the sample reference location on the SPM sample; and
receiving a third input indicating the location of the second SPM tip and a fourth input indicating the sample reference location.

6. A method according to claim 5, wherein the identifying of the first location information further comprises:
determining a first coordinate corresponding to the location of first SPM tip based on the first input; and
determining a second coordinate corresponding to the sample reference location based on the second input,
wherein the first location information corresponds to the first and second coordinates,
wherein the identifying of the second location information further comprises:
determining a third coordinate corresponding to the location of the second SPM tip based on the third input; and
determining a fourth coordinate corresponding to the sample reference location based on the fourth input, and
wherein the second location information corresponds to the third and fourth coordinates.

7. A method according to claim 6, wherein the calculating of the displacement comprises:
calculating a first difference between the first and third coordinates; and
calculating a second difference between the second and fourth coordinates.

8. A method according to claim 7, wherein the translating comprises:
moving either the second SPM tip or a stage supporting the SPM sample based on the first and second differences.

9. A method according to claim 1, wherein the sample reference location corresponds to a marking on the SPM sample, and
wherein the marking is viewable with an optical microscope.

10. A method according to claim 9, further comprising:
creating a marking on the SPM sample that is viewable with an optical microscope,
wherein the created marking corresponds to the sample reference location.

11. A method according to claim 1, further comprising:
forming a first pattern on the SPM sample with the first SPM tip delivering a patterning compound to the SPM sample; and
forming a second pattern on the SPM sample with the second SPM tip delivering a patterning compound to the SPM sample after the translation.

12. A method according to claim 11, wherein the first pattern is formed with a first ink, and the second pattern is formed with a second ink different from the first ink.

13. A method according to claim 1, further comprising:
using a pattern recognition algorithm to identify the first location information and the second location information.

14. A method according to claim 1, wherein the first and second location information further includes multiple sample reference locations.

15. A method according to claim 14, wherein the translating comprises:.
rotating the SPM sample based on the multiple sample reference locations of the first location information and the multiple sample reference locations of the second location information.

16. A method according to claim 1, wherein each of the first and second SPM tips is an array of probe tips.

17. A method according to claim 1, further comprising:
forming a first pattern on the SPM sample with the first SPM tip, the first pattern including at least one alignment mark;
generating an image of the SPM sample with the second SPM tip;
identifying the at least one alignment mark from the generated image;
aligning a second SPM pattern based on the identified at least one alignment mark; and
forming a second pattern on the SPM sample with the second SPM tip such that the second pattern is aligned with the first pattern.

18. A method according to claim 17, wherein the aligning further comprises:
displaying the generated image of the SPM sample;
overlaying the second pattern on the displayed image, the second pattern including the at least one alignment mark; and
adjusting the position of either the second SPM tip or the SPM sample such that the at least one alignment mark in the generated image is aligned with the at least one alignment mark of the second pattern.

* * * * *